United States Patent
Kon et al.

(10) Patent No.: US 7,066,454 B2
(45) Date of Patent: Jun. 27, 2006

(54) ACTIVE TYPE VIBRATION ISOLATING SUPPORT SYSTEM

(75) Inventors: Hirozumi Kon, Miyagi (JP); Tomohiko Kaneko, Miyagi (JP); Hirotomi Nemoto, Saitama (JP); Hiroaki Ue, Saitama (JP); Tetsuo Mikasa, Saitama (JP); Ken Iinuma, Saitama (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/808,605

(22) Filed: Mar. 25, 2004

(65) Prior Publication Data

US 2005/0001365 A1    Jan. 6, 2005

(30) Foreign Application Priority Data

Mar. 26, 2003   (JP)   ............................. 2003-084783
Mar. 26, 2003   (JP)   ............................. 2003-084784

(51) Int. Cl.
*F16F 13/00*  (2006.01)

(52) U.S. Cl. ........................... 267/140.14; 267/140.15; 267/140.13

(58) Field of Classification Search ........... 267/140.15, 267/140.14, 140.13, 219, 136, 140.11, 140.2, 267/140.4, 140.5; 248/638, 636, 562; 310/14, 310/30
See application file for complete search history.

(56) References Cited

U.S. PATENT DOCUMENTS

| | | | |
|---|---|---|---|
| 5,905,317 A * | 5/1999 | Aoki ..................... | 267/140.14 |
| 6,254,069 B1 * | 7/2001 | Muramatsu et al. ... | 267/140.14 |
| 6,422,546 B1 * | 7/2002 | Nemoto et al. ........ | 267/140.14 |
| 6,631,895 B1 * | 10/2003 | Nemoto ................ | 267/140.14 |
| 6,641,120 B1 * | 11/2003 | Nemoto ................ | 267/140.14 |

FOREIGN PATENT DOCUMENTS

| JP | 2001-1765 | | 1/2001 |
|---|---|---|---|
| JP | 2003-21189 A | * | 1/2003 |

* cited by examiner

*Primary Examiner*—James McClellan
*Assistant Examiner*—Mariano Sy
(74) *Attorney, Agent, or Firm*—Arent Fox PLLC

(57) ABSTRACT

An active type vibration isolating support system includes: an elastic body for elastically supporting a vibratory body; a liquid chamber to be defined by the elastic body; a movable member for changing capacity of the liquid chamber; and an actuator for driving the movable member. The actuator has: a fixed core; a movable core coupled to the movable member for being arranged opposite to the fixed core via an air gap; and a coil for generating an electromagnetic attracting force between the fixed and movable cores. The movable member and the movable core are coupled together through coupling units capable of adjusting the air gap. Thus, without preparing several types of coupling members, it is possible to obtain a desired vibration isolating characteristic by freely adjusting the air gap between the fixed core and the movable core.

14 Claims, 9 Drawing Sheets

ACTIVE TYPE VIBRATION ISOLATING SUPPORT SYSTEM

BACKGROUND OF THE INVENTION

1. Field of the Invention

The present invention relates to improvement of an active type vibration isolating support system comprising: an elastic body for elastically supporting a vibratory body on a supporting system; a liquid chamber which is defined by this elastic body and in which liquid is sealed; a movable member for changing capacity of this liquid chamber; and an actuator for driving this movable member, the system being electromagnetically constructed with the actuator equipped with: a fixed core which is supported by the supporting system; a movable core which is coupled to the movable member and is arranged opposite to this fixed core; and a coil for generating an electromagnetic attracting force between these fixed and movable cores.

2. Description of the Related Art

Such an active type vibration isolating support system is already known as disclosed in, for example, Japanese Patent Application Laid-Open No. 2001-1765.

In the active type vibration isolating support system, characteristics of the movable member concerning thrust and displacement are dependent on an initial air gap between attracted surfaces of those fixed and movable cores of the actuator, but the above-described initial air gap may not be within the tolerance due to accumulated manufacturing errors of each part of the actuator. In the conventional one, for such an occasion, several types of coupling members with different length for coupling the movable member to the movable core have been prepared in advance and the above-described air gap has been adjusted by replacing the coupling member.

However, such adjustment means for air gaps requires several types of coupling members, and moreover, takes time and efforts in the replacement operation, so that the cost is inevitably increased.

SUMMARY OF THE INVENTION

The present invention has been achieved in view of the above-described circumstances, and has an object to provide a low-priced active type vibration isolating support system capable of easily obtaining a desired vibration isolating characteristic without preparing several types of coupling members, by freely adjusting rendering an air gap between a fixed core and a movable core.

In order to achieve the above-described object, according to the present invention, there is provided an active type vibration isolating support system comprising: an elastic body for elastically supporting a vibratory body on a supporting system; a liquid chamber defined by this elastic body, in which liquid is sealed; a movable member for changing capacity of this liquid chamber; and an electromagnetic actuator for driving this movable member, wherein the actuator is equipped with: a fixed core to be supported on the supporting system; a movable core to be coupled to the movable member, for being arranged opposite to this fixed core via an air gap; a coil for generating an electromagnetic attracting force between these fixed and movable cores; and a coupling device for coupling the movable member to the movable core so as to be able to adjust the air gap between the fixed core and the movable core.

With this feature, by operating the coupling device, it is possible to freely adjust the air gap between the fixed core and the movable core to impart a desired vibration isolating characteristic to the active type vibration isolating support system. Therefore, it is easy to adjust the air gap, and besides, it becomes unnecessary to prepare plural types of components having different dimensions in order to adjust the air gap, whereby the cost can be reduced.

Also, according to another feature of the present invention, there is provided an active type vibration isolating support system, comprising: an elastic body for elastically supporting a vibratory body on a supporting system; a liquid chamber defined by this elastic body, in which liquid is sealed; a movable member for changing capacity of this liquid chamber; and an electromagnetic actuator for driving this movable member, wherein the actuator is equipped with: a fixed core to be supported by the supporting system; a movable core to be coupled to the movable member for being arranged opposite to this fixed core via a conical tube-shaped air gap; a coil for generating an electromagnetic attracting force between these fixed and movable cores; a coupling device coupled to the movable member to penetrate the movable core in the axial direction so as to be relatively movable to support a fixed core-side end surface of the movable core; a set spring provided between the movable member and the movable core in a compressed state, for biasing the movable core toward a supporting portion of the coupling device; and a stopper member which even after the movable core has reached a limit of movement on the fixed core side, enables moving toward the fixed core side while the movable member compresses the set spring, and in order to restrict compression and deformation of the set spring in a predetermined amount or more, limits an amount of movement of the movable member after the movable core reaches the limit of movement.

With this another feature, when the movable member receives excessive pressure in the liquid chamber and the movable core reaches the limit of movement toward the fixed core side, the set spring is compressed and becomes deformed, the supporting portion of the coupling means is moved away from the movable core, and the movable member is allowed to further move toward the fixed core side. Therefore, the excessive load of the movable member is absorbed by the set spring to prevent an operation of an over-load on the fixed core and the movable core, so that their durability can be secured.

Also, since an amount of movement of the movable member after the movable core reaches the limit of movement is restricted by a stopper member, it is possible to restrict an excessive increase in the load at the set spring, thereby preventing an increase in over-load on the fixed core and the movable core.

The supporting system includes the casing C and the body frame F in the embodiments of the present invention to be described later, the vibratory body includes the engine E, the elastic body includes the first elastic body 14, the coupling device includes the coupling bolt 55 and the adjustment nut 56, and the stopper member includes the peg body 61.

The above-described object, other objects, characteristics, and advantages of the present invention will become apparent from an explanation of a preferred embodiment, which will be described in detail below by reference to the attached drawings.

DESCRIPTION OF THE PREFERRED EMBODIMENTS

Hereinafter, the preferred embodiments of the present invention will be described by reference to the attached drawings.

Figure 1:
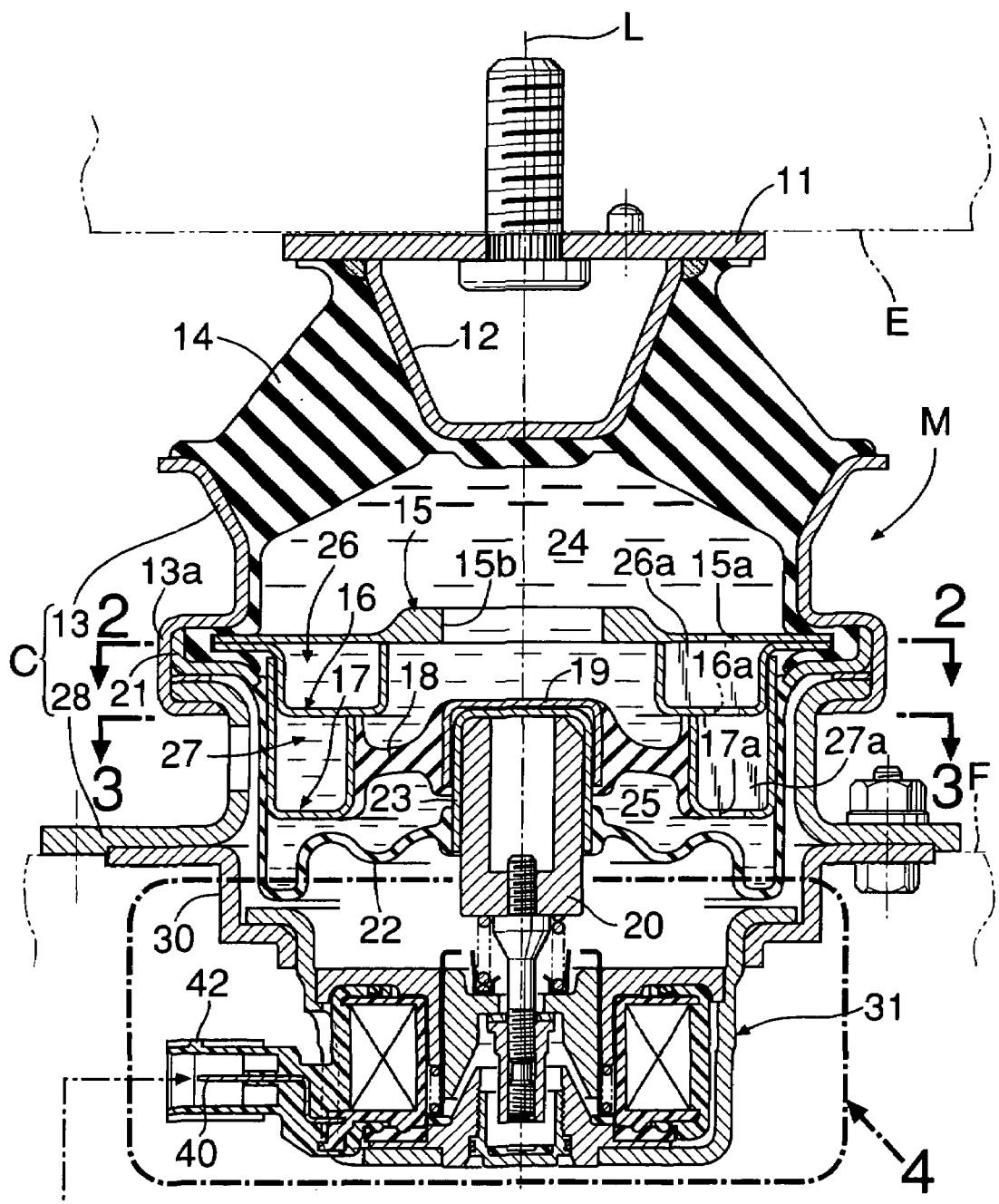
FIG. 1 is a longitudinal section showing an active type vibration isolating support system according to a first embodiment of the present invention.
Figure 1:
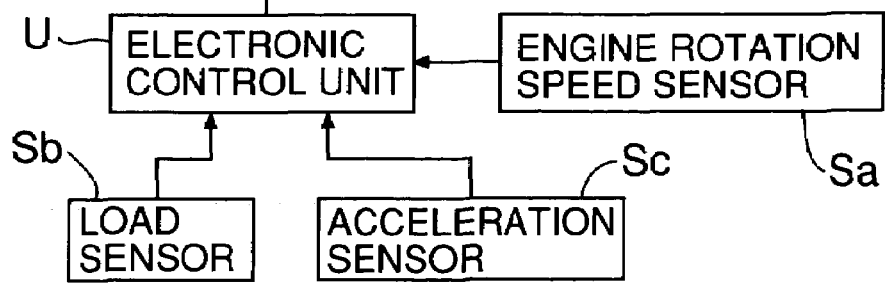
Figure 2:
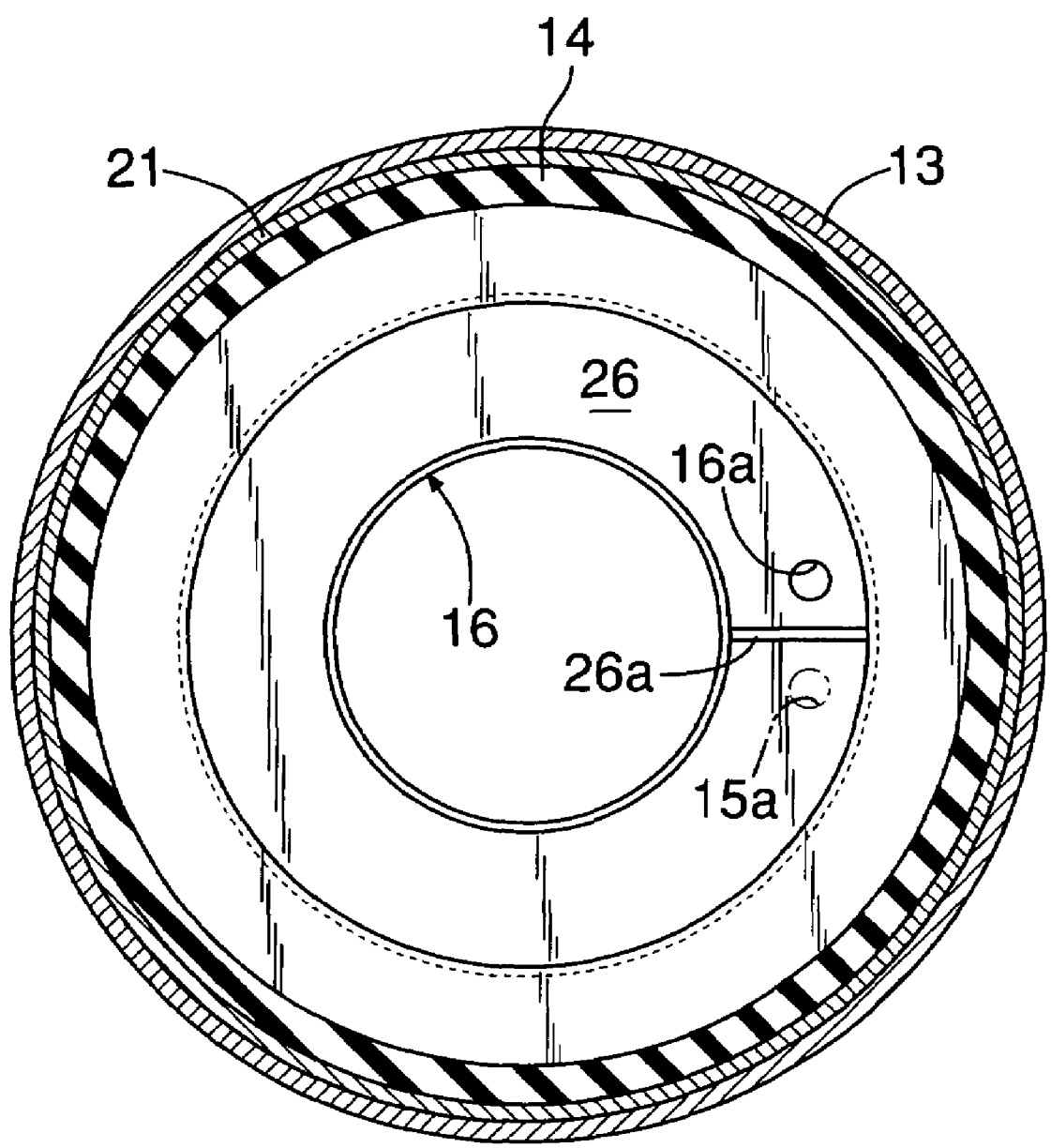
FIG. 2 is a sectional view taken on line 2—2 in FIG. 1.
Figure 3:
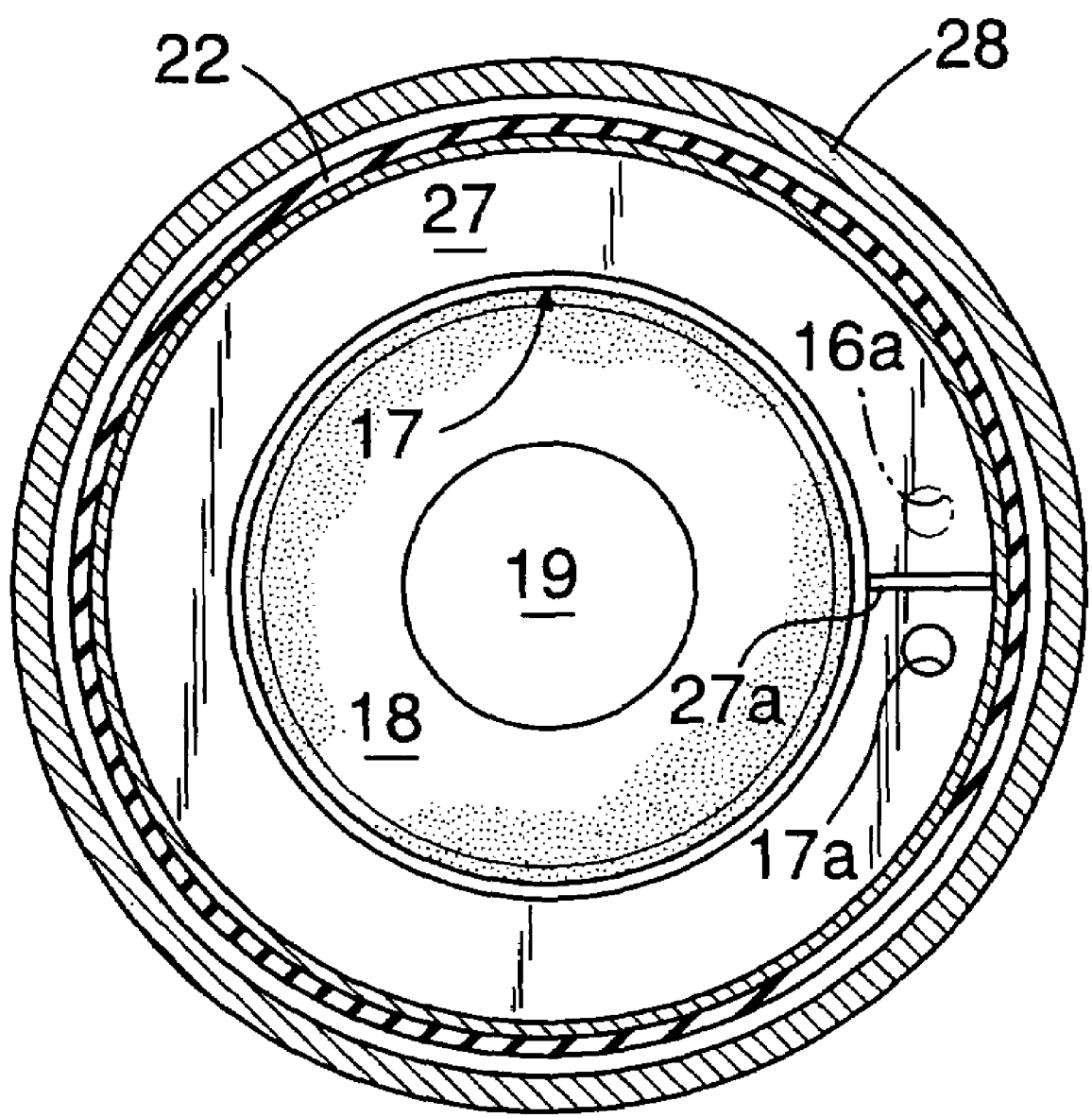
FIG. 3 is a sectional view taken on line 3—3 in FIG. 1.

First, a first embodiment of the present invention shown in FIG. 1 to FIG. 4 will be described. In FIG. 1, an active type vibration isolating support system M is, in order to elastically support the engine E on the body frame F in an automobile, interposed therebetween.

The active type vibration isolating support system M has actually axisymmetric structure with respect to an axis L, and has a plate-shaped installation bracket 11 to be connected to the engine E; an inner tube 12 welded to this installation bracket 11; an outer tube 13 which is coaxially arranged around an outer periphery of this inner tube 12; and a first elastic body 14 made of thick rubber or the like to be vulcanized and bonded onto conical surfaces of these inner tube 12 and outer tube 13 which oppose to each other. Below this first elastic body 14, there are arranged a first orifice formation member 15, a second orifice formation member 16 and a third orifice formation member 17, which are arranged vertically and made integral with one another.

The first orifice formation member 15 is shaped like a disk, and has an aperture 15b at a center thereof. The second orifice formation member 16 is annular, having a gutter-shaped cross section, the upper surface of which has been opened, and is integrally joined with the first orifice formation member 15 so that the opened upper surface is closed by the first orifice formation member 15. The third orifice formation member 17 is also annular, having a gutter-shaped cross section, the upper surface of which has been opened, and is integrally joined with the second orifice formation member 16 so that the opened upper surface is closed by the second orifice formation member 16. Outer peripheral portions of the first and second orifice formation members 15, 16 are superimposed on to be made integral with each other, and are fixed to an annular crimping fixed portion 13a continuously provided below the outer tube 13.

On an inner peripheral surface of the third orifice formation member 17, an outer peripheral surface of the annular second elastic body 18 made of rubber or the like is vulcanized and bonded. On the inner peripheral surface of this second elastic body 18, there is vulcanized and bonded a first cap member 19 with the lower surface opened, arranged on the axis L. In this first cap member 19, a second cap member 23 and a movable member 20 are fixed by press-fitting in order. The second cap member 23 has its lower end portion protruding toward a lower place of the first cap member 19. On the outer peripheral surface of this protruded portion, there is vulcanized and bonded an inner peripheral end portion of a diaphragm 22 arranged below the second elastic body 18. On the outer periphery of this diaphragm 22, a ring member 21 is vulcanized and bonded, and this ring member 21 is fixed to the crimping fixed portion 13a together with the outer peripheral portions of the first and second orifice formation members 15, 16. Because of deflection of the second elastic body 18 and the diaphragm 22, the movable member 20 is capable of moving up and down together with the first and second cap members 19, 23.

Thus, between the first elastic body 14 and the second elastic body 18, a first liquid chamber 24, in which liquid is sealed, is defined, and between the second elastic body 18 and the diaphragm 22, a second liquid chamber 25, in which liquid is likewise sealed, is defined. These first and second liquid chambers 24, 25 communicate with each other via an upper orifice 26 and a lower orifice 27 formed by the first to third orifice formation members 15 to 17.

The upper orifice 26 is defined over a little less than one round thereof between the first and second orifice formation members 15, 16 (See FIG. 2), and a partition wall 26a for constituting opposite end walls of the upper orifice 26 is welded between the first and second orifice formation members 15, 16. The upper orifice 26 communicates with the first liquid chamber 24 via a through-hole 15a in the first orifice formation member 15 on one side of the partition wall 26a, and communicates with the lower orifice 27 via a through-hole 16a in the second orifice formation member 16 on the other side of the partition wall 26a.

The lower orifice 27 is defined over a little less than one round thereof between the second and third orifice formation members 16, 17 (See FIG. 3), and a partition wall 27a for constituting both end walls of the lower orifice 27 is welded between the first and second orifice formation members 15, 16. The upper orifice 26 communicates with the upper orifice 26 via the through-hole 16a on one side of the partition wall 27a, and communicates with the second liquid chamber 25 via a through-hole 17a of the third orifice formation member 17 on the other side of the partition wall 27a. Therefore, the first and second liquid chambers 24, 25 are caused to communicate with each other via the upper and lower orifices 26, 27 which have been connected with each other in series.

To the crimping fixed portion 13a, a tube-shaped bracket 28 is also fixed, and this is fixed to the body frame F, whereby the active type vibration isolating support system M is installed to the body frame F. This tube-shaped bracket 28 and the outer tube 13 constitute a supporting casing C of the active type vibration isolating support system M.

To the tube-shaped bracket 28, an actuator supporting member 30 is fixed, and the electromagnetic actuator 31 for driving the movable member 20 is supported by this actuator supporting member 30.

Figure 4:
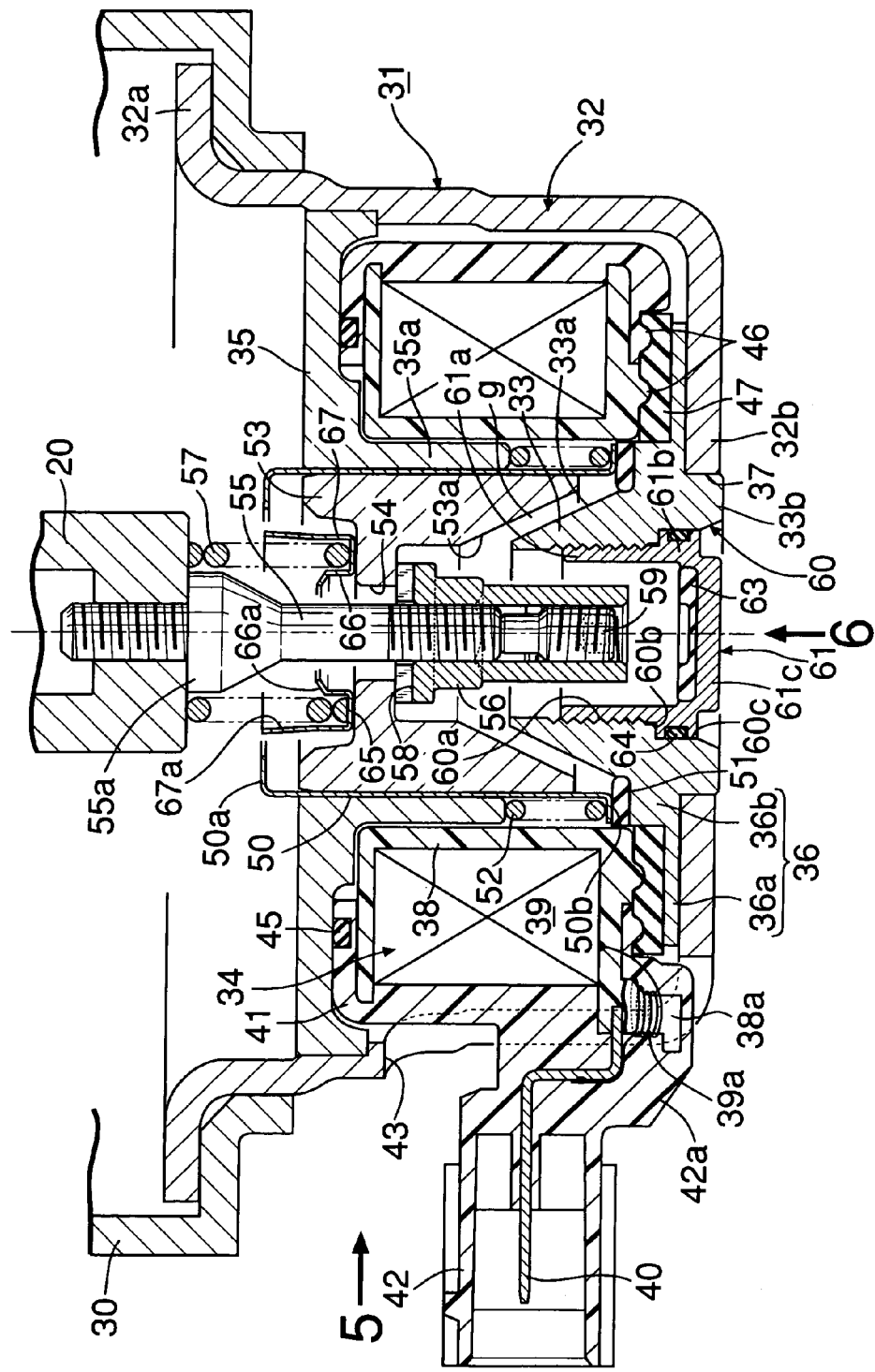
FIG. 4 is an enlarged view showing a part 4 in FIG. 1.

In FIG. 4, the actuator 31 has a closed-end tube-shaped housing 32 made of magnetic material, the upper surface of which has been opened, and a flange 32a formed at the upper end thereof is fixed to the actuator supporting member 30. The housing 32 is magnetic material, within which there are installed the fixed core 33, the coil assembly 34 and the upper yoke 35 in order. The fixed core 33 has an attracted surface 33a in an upper part thereof, a positioning shaft 33b protruding on an underside thereof, and a stepped collar-shaped lower yoke 36 formed at the outer periphery. The lower yoke 36 is brought into close contact with the bottom wall 32b of the housing 32 so that the positioning shaft 33b is pressed into the positioning hole 37 in the bottom wall 32b. Thus, the fixed core 33 is fixed to the housing 32.

The coil assembly 34 has a bobbin 38 made of synthetic resin to be arranged at the outer periphery of the fixed core 33, and a coil 39 to be wound around this bobbin 38. On the outer periphery of the lower flange of the bobbin 38, a small strut 38a protruding downward is projectingly provided. During molding of this small strut 38a, a proximal end portion of the coupler terminal 40 is insert-connected to the small strut 38a. Around the small strut 38a, an outgoing line 39a of the coil 39 is wound, the tip end of which is connected to the coupler terminal 40 by means of soldering, electric welding or the like.

Figure 5:
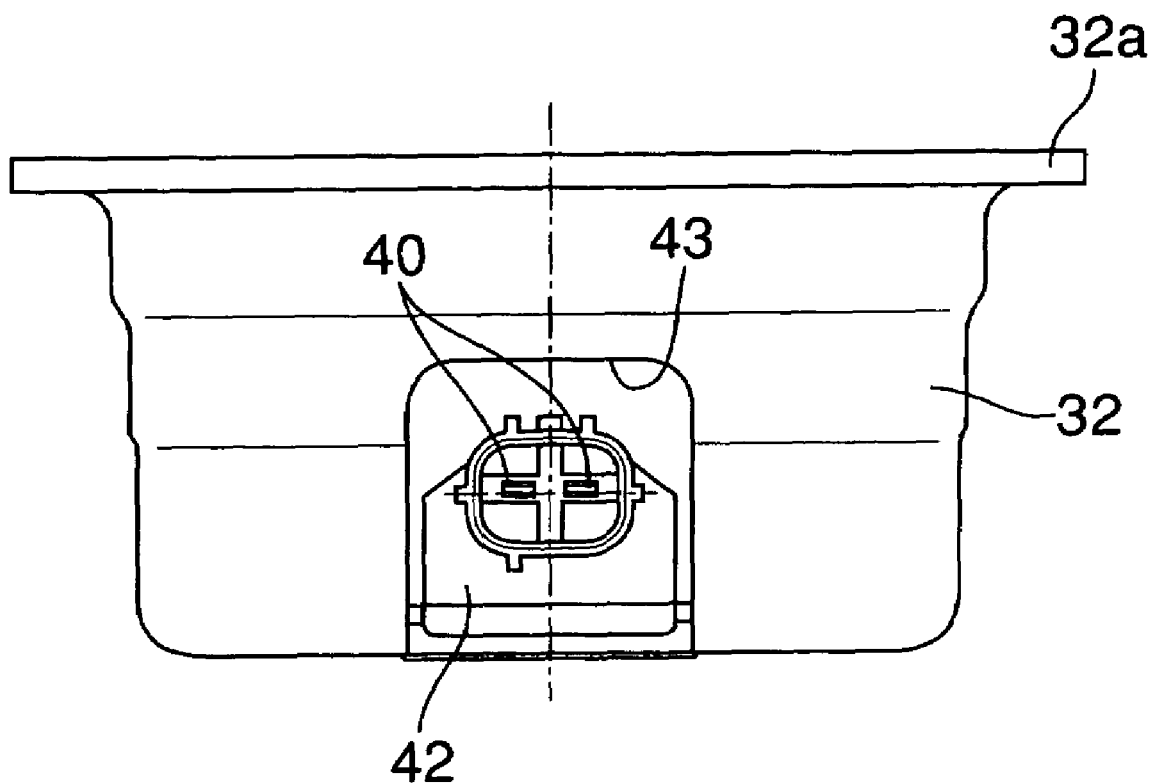
FIG. 5 is a view taken from arrow 5 in FIG. 4.
Figure 6:
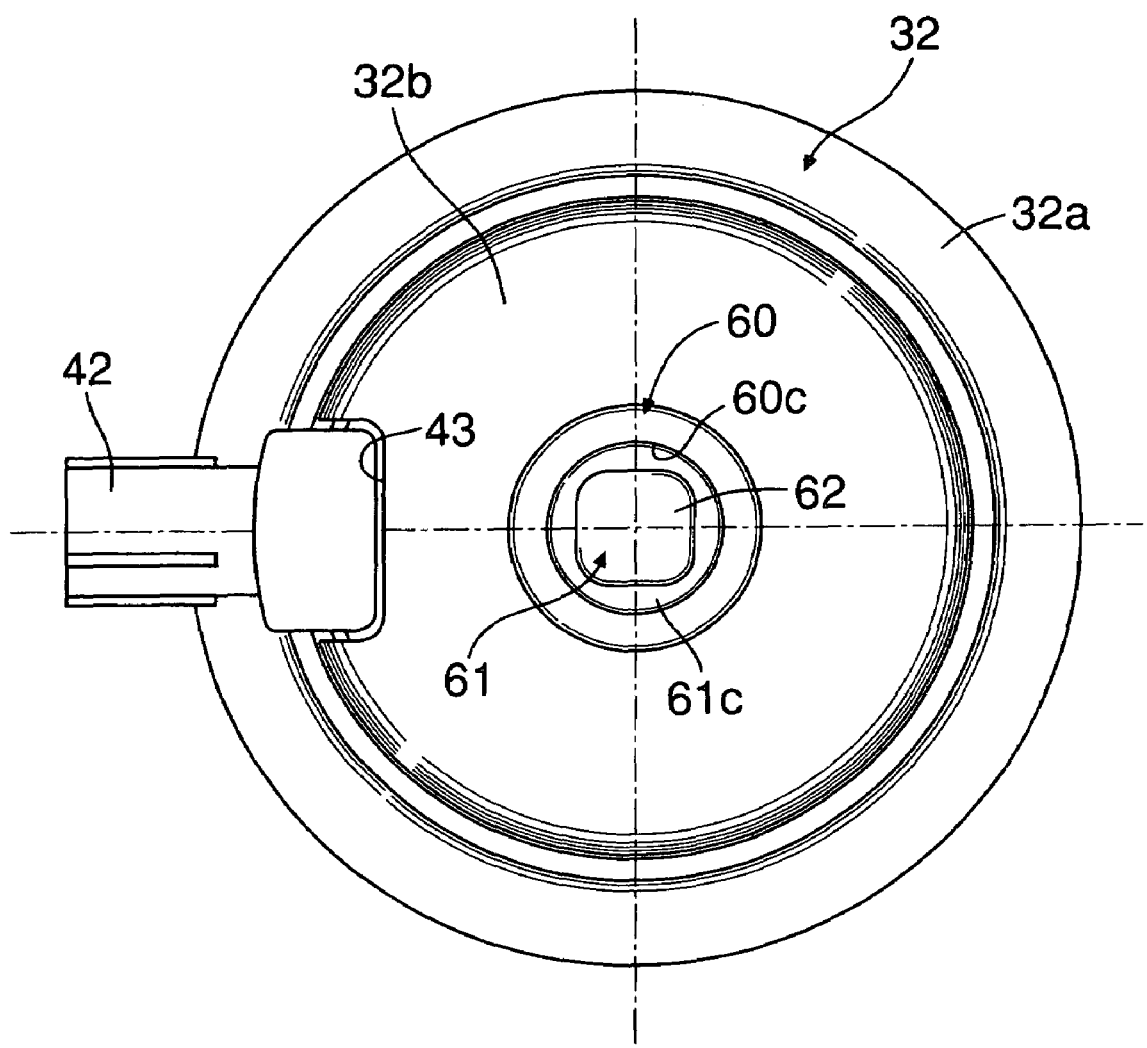
FIG. 6 is a view taken from arrow 6 in FIG. 4.

After the outgoing line 39a is connected to the coupler terminal 40, in order to seal the coil 39 to the bobbin 38, a tube-shaped coil cover 41 which comes into close contact from the upper and lower end surfaces of the bobbin 38 to the outer peripheral surface of the coil 39 is injection-molded using synthetic resin. On that occasion, on this coil cover 41, there are integrally formed a coupler 42 for holding the coupler terminal 40 to protrude outward in the radial direction of the cover 41, and a protruded portion 42a for enveloping the outgoing line 39a from the small strut 38a to protrude on the lower end surface of the cover 41. This coupler 42 is arranged so as to expose outside the housing 32 through an aperture 43 provided from the bottom wall 32b of the housing 32 to the peripheral wall (See FIGS. 5 and 6). The protruded portion 42a is arranged within the aperture 43 so as to be adjacent to the bottom wall 32b of the housing 32.

On the upper end surface of the coil assembly 34, particularly on the upper end surface of the coil cover 41, there is mounted an annular sealing member 45. Also, on the lower end surface of the coil assembly 34, particularly on the lower end surfaces of the bobbin 38 and the coil cover 41, a plurality of sealing convex ridges 46, 46 which surround the fixed core 33 for concentrically lining up are integrally formed. Between their lower end surfaces and thin outer peripheral portion 36a of the lower yoke 36, there is interposed an elastic plate 47. This elastic plate 47 is molded with elastic material such as NBR or silicone rubber.

The upper yoke 35 is fixed to the inner peripheral surface of the housing 32 by press-fitting in order to press and hold the coil assembly 34 toward the lower yoke 36. With the fixing, the sealing member 41 and the elastic plate 47 are compressed, whereby the coil assembly 34 is elastically supported without looseness between the upper yoke 35 and the lower yoke 36, so that vibration resistance of the coil assembly 34 and water resistance of the coil 39 are improved. Particularly, since the sealing convex ridges 46, 46 of the bobbin 38 and the coil cover 41 on the lower end surface cut into the upper surface of the elastic plate 47 to further reliably seal the elastic plate 47, when rain water or washing water enters the aperture 43 from the outside to accumulate at the bottom of the housing 32, even if contact between the coil cover 41, and the coil 39 and the bobbin 38 is insufficient, it is possible to reliably prevent water from entering the inner periphery side of the bobbin 38, to say nothing of entering the coil 39 side.

On the inner peripheral surface of a cylindrical portion 35a to be arranged on the inner periphery of the bobbin 38 of the upper yoke 35, a thin tube-shaped bearing member 50 is slidably fitted. At the upper end of this bearing member 50, an inwardly-facing flange 50a pointing inwardly in the radial direction is integrally formed, while at the lower end thereof, an outwardly-facing flange 50b pointing outwardly in the radial direction is integrally formed. The outwardly-facing flange 50b is superimposed on the thick inner peripheral portion 36b of the lower yoke 36 through the annular elastic plate 51, and between this outwardly-facing flange 50b and the fixed core 33, a set spring 52 made of coil spring is provided in a compressed state, whereby the bearing member 50 is elastically held on the lower yoke 36 for vibration isolation.

Also, when the movable core 53 descends on the fixed core 33 side, the elastic plate 51 also serves as a descending stopper for the movable core 53, which receives the lower end of the movable core 53 as a cushion in order to avoid collision between both cores 33, 53 and defines a descending limit thereof.

Slidably fitted to the bearing member 50 is the movable core 53 having an attracted surface 53a opposed to an attracted surface 33a of the fixed core 33 through the air gap g. The upper end of a connecting bolt 55 which loosely penetrates a comparatively large-diameter through-hole 54 opened at the central part of this movable core 53 is threadably attached to the movable member 20. At the lower end portion of the connecting bolt 55, an adjustment nut 56 of the movable core 53 for supporting the lower end surface around the through-hole 54 is threadedly engaged. On that occasion, the set spring 57 for holding the movable core 53 at a supporting position by the adjustment nut 56 is provided between the movable member 20 and the movable core 53 in a compressed state. Thus, the movable core 53 is elastically interposed between the set spring 57 and an adjustment nut 56 threadedly engaged with the connecting bolt 55 made integral with the movable member 20. On the upper end surface of the adjustment nut 56 held in press contact with the movable core 53, a radial ventilating groove 58 communicating with the through-hole 54 is formed in such a manner that when the movable core is moving up and down, air can be smoothly circulated in space above and below it.

Thus, if a threaded position of the adjustment nut 56 with the connecting bolt 55 is advanced and retreated, up and down positions of the movable core 53, that is, the air gap g between attracted surfaces 33a and 53a of the movable core 53 and the fixed core 33 can be adjusted by corporation with the set spring 57. An adjustment position of the adjustment nut 56 is threadedly engaged with and tightly fastened from below by the adjustment nut 56, and is fixed by a lock screw 59.

Figure 7:
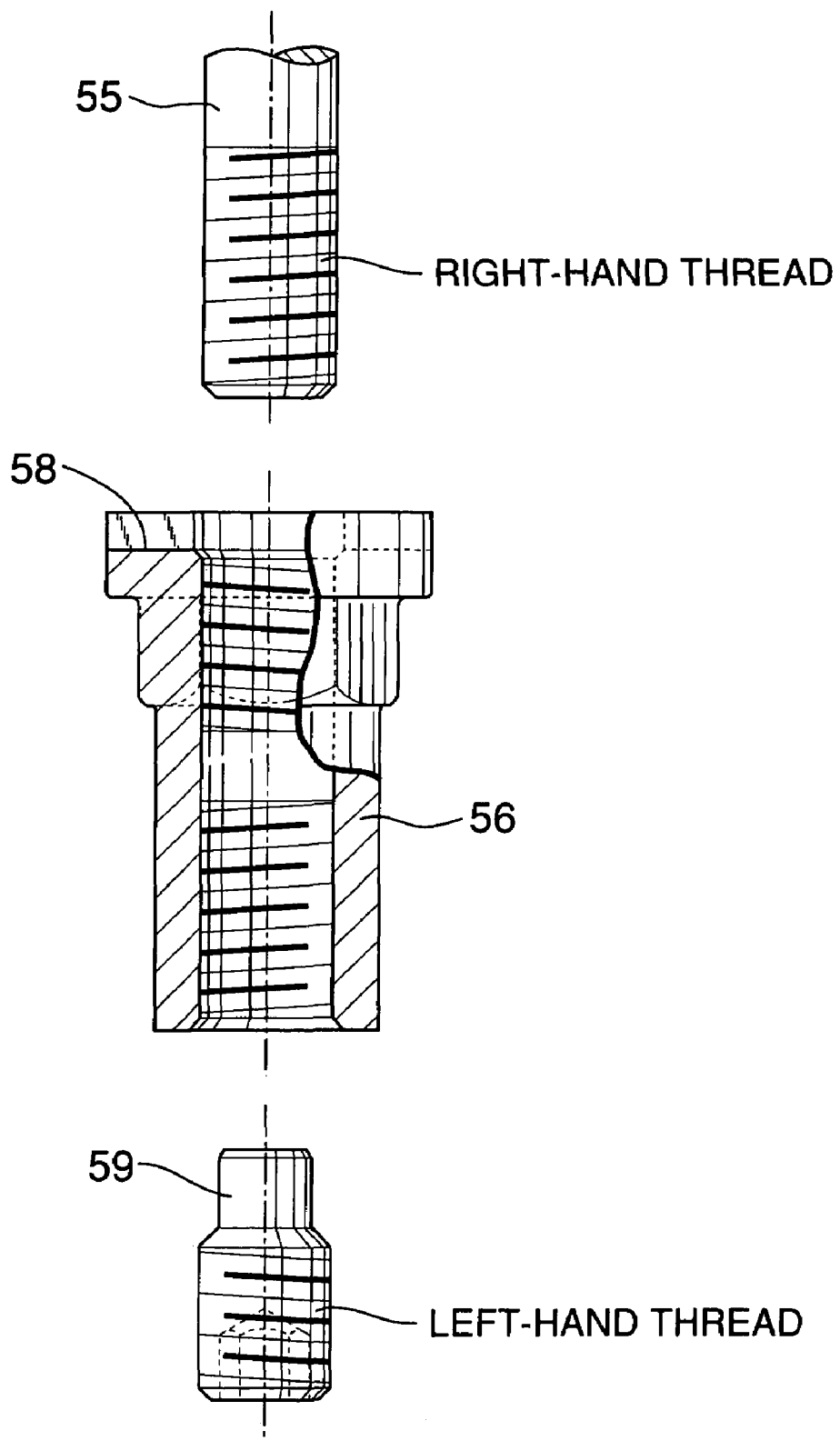
FIG. 7 is a perspective view showing an adjustment nut in FIG. 4.
Figure 8:
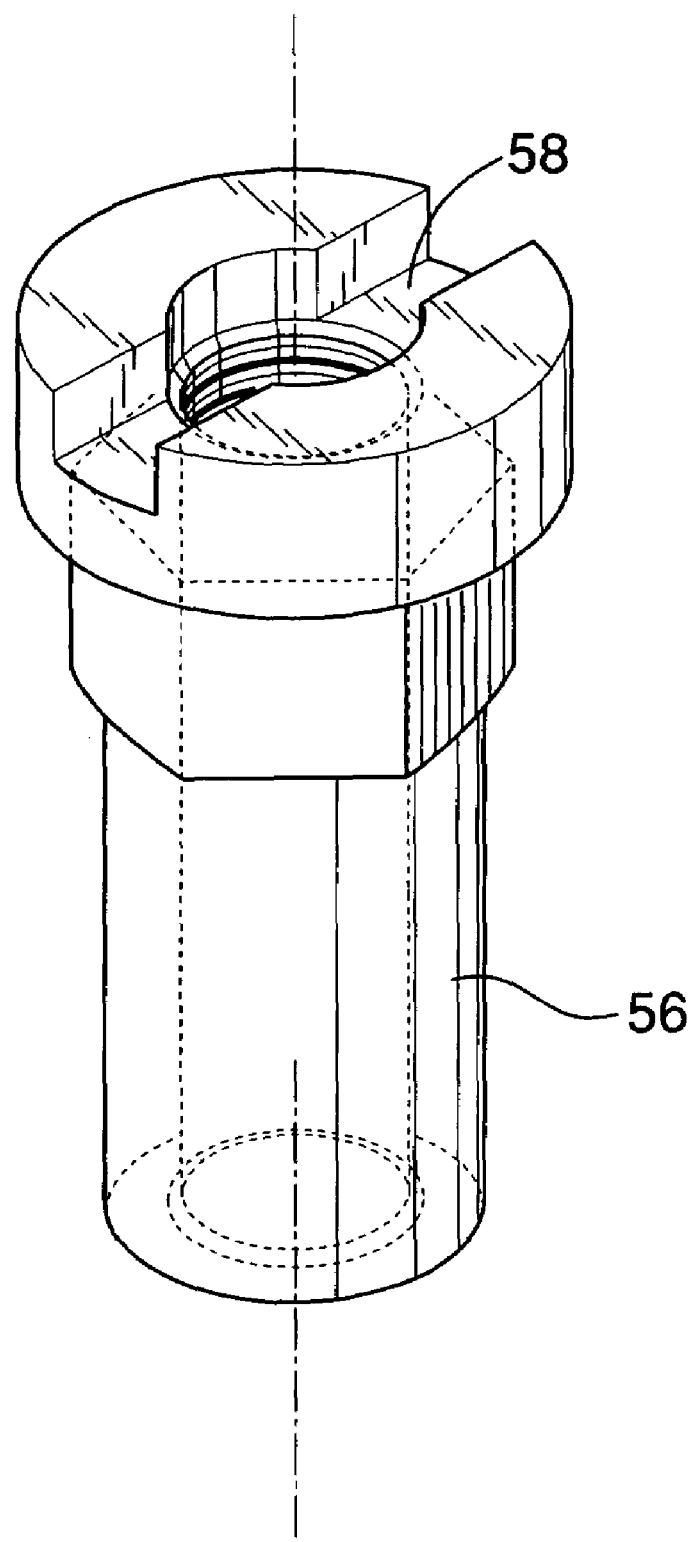
FIG. 8 is a longitudinal section of an exploded side view showing the adjustment nut, a connecting bolt and a lock screw.

As shown in FIGS. 7 and 8, a threaded portion of the connecting bolt 55 has a normal right-hand thread, whereas in the threaded portion of the lock screw 59, a left-hand thread is formed. Therefore, if in a state in which the adjustment nut 56 is held at a predetermined adjustment position by a tool, the lock screw 59 is fastened in by another tool, torque of the lock screw 59 is transmitted to the connecting bolt 55 through friction so that the connecting bolt 55 is drawn in on the lock screw 59 side. Therefore, it is possible to reliably lock at the adjustment position of the adjustment nut 56.

At the central portion of the fixed core 33, an adjustment operating hole 60 for allowing the adjustment nut 56 to go in and out is provided, and by means of a tool inserted into this adjustment operating hole 60, the lock screw 59 and the adjustment nut 56 are adapted able to be operated. The adjustment operating hole 60 is composed of a threaded hole 60a and a fitting hole 60c having a diameter larger than that of the threaded hole 60a, continuing to the lower end of the threaded hole 60a through an annular shoulder portion 60b. On the other hand, a peg body 61 closing the adjustment operating hole 60 is shaped like a bottomed tube with its upper end opened, and has a threaded tube 61a to be threadedly engaged with the threaded hole 60a while receiving the adjustment nut 56, a collar portion 61b to be fitted in a fitting hole 60c, and a bottom portion 61c. On the outer periphery of the collar portion 61b, there is mounted a sealing member 64 which comes into close contact with the inner peripheral surface of the fitting hole 60c. At the underside of the bottom portion 61c, there is formed a polygonal tool engaging projection 62.

Until the collar portion 61b fitted in the fitting hole 60c abuts against the shoulder portion 60b, the threaded tube 61a is threadedly engaged with and tightly fastened to the threaded hole 60a, whereby the adjustment operating hole 60 can be closed watertightly by the peg body 61.

On the upper surface of the bottom portion 61c of this peg body 61, the elastic plate 63 is bonded, and the bottom portion 61c receives the lower end of the adjustment nut 56 through this elastic plate 63 as a cushion to define a descending limit of the movable member 20. However, when the adjustment nut 56 abuts against the bottom portion 61c of the peg body 61, the movable member 20 further descends while the movable member 20 compresses the set spring 57 after the movable core 53 reaches the above-described descending limit by descending of the movable member 20.

Within the bearing member 50, each of attracted surfaces 33a, 53a of the fixed core 33 and the movable core 53 which oppose to each other is formed in a conical surface so as to define a conical tube-shaped air gap g therebetween, and is arranged so that the attracted surface 53a of the movable core 53 surrounds the attracted surface 33a of the fixed core 33. Therefore, even in the fixed core 33 and the movable core 53 within the bearing member 50, each having a comparatively small diameter within the bearing member 50, it is possible to acquire a comparatively strong attraction force and a comparatively long stroke of the movable core 53.

Moreover, since the attracted surface 53a of the movable core 53 is to be formed on the inner peripheral surface side of the core 53, a supporting span of the movable core 53 by the bearing member 50 can be secured sufficiently long irrespective of the attracted surface 53a, and stable ascent and descent of the movable core 53 can be ensured. In this case, it is effective in acquiring further stable, smooth ascent and descent of the movable core 53 that the outer peripheral surface of the movable core 53 is formed with a low friction material layer made of Teflon or the like.

The set spring 57 is made of coil spring, and by fitting it to a large-diameter portion 55a at the base of the connecting bolt 55, the set spring 57 is arranged concentrically with the connecting bolt 55. Also, between this set spring 57 and the movable core 53, there is interposed an annular spring seat 65 made of steel plate in order to prevent the movable core 53 from wearing. This spring seat 65 has inner and outer concentric positioning tubular portions 66, 67 which stand up along the inner peripheral surface and outer peripheral surface of the set spring 57 from the inner peripheral edge portion and outer peripheral edge portion, and the outside positioning tubular portion 67 is formed longer than the inside positioning tubular portion 66. In order to facilitate insertion of the set spring 57 between these positioning tubular portions 66, 67, there are formed funnel portions 66a, 67a at the upper end portions of the positioning tubular portions 66, 67. Also, on at least one of abutted surfaces in which this spring seat 65 and the movable core 53 oppose to each other, a low friction material layer of Teflon or the like is formed to thereby make sliding property of the spring seat 65 to the movable core 53 excellent.

Referring to FIG. 1, to a coil 39 of the actuator 31, an electronic control unit U is connected through a coupler 42, and to this electronic control unit U, there is inputted each detection signal of a rotation speed sensor Sa for detecting engine rotation speed, a load sensor Sb for detecting a load to be inputted into an active type vibration isolating support system M, and an acceleration sensor Sc for detecting acceleration that is exerted on an engine E.

Next, the description will be made of an operation of this embodiment.

When the actuator 31 of the active type vibration isolating support system M is in a non-operating state, although the first and second liquid chambers 24, 25 which communicate with each other through the upper and lower orifices 26, 27 are kept at the same pressure, since a pressure receiving area in the fist liquid chamber 24 of the first cap member 19 connected to the movable member 20 is larger than a pressure receiving area in the second liquid chamber 25, a downward load obtained by multiplying the difference in area by pressure in the first liquid chamber 24 is exerted on the movable member 20. When a balance is established between the load and a repulsion force of the second elastic body 18 against it, the movable member 20 comes to a halt, forming a predetermined initial air gap g between adsorption surfaces 33a, 53a of the fixed core 33 and the movable core 53.

When shake vibration of low frequency occurs in the engine E during running of an automobile, the first elastic body 14 is deformed because of a load inputted from the engine E to change capacity of the first liquid chamber 24. Then, the liquid goes and comes between the first and second liquid chambers 24, 25 which communicate with each other through the upper and lower orifices 26, 27. When the capacity of the first liquid chamber 24 is enlarged and reduced, the capacity of the second liquid chamber 25 is reduced and enlarged accordingly, and the variations in capacity of this second liquid chamber 25 are absorbed by elastic deformation of a diaphragm 22. At this time, since shapes and dimensions of the upper and lower orifices 26, 27 and spring constant of the first elastic body 14 have been set so as to show high spring constant and a high attenuation force in a frequency domain of the shake vibration, vibration to be transmitted from the engine E to the body frame F can be effectively reduced.

In such a shake vibration domain of low frequency of the engine E, the actuator 31 is kept in a non-operating state.

When vibration of a frequency higher than the shake vibration, that is, idle vibration or booming noise vibration that occurs during idling of the engine E occurs, liquid within the upper and lower orifices 26, 27 which connect the first and second liquid chambers 24, 25 enters a stick state, so that the engine E becomes unable to exhibit a vibration isolating function. In such a case, the actuator 31 is driven to exhibit the vibration isolating function.

In other words, the electronic control unit U controls energizing to a coil 39 of the actuator 31 on the basis of a detection signal inputted from the engine rotation speed sensor Sa, the load sensor Sb, the acceleration sensor Sc and the like. Specifically, when the engine E leans is displaced downward because of vibration and the capacity of the first liquid chamber 24 is reduced due to the downward deformation of the first elastic body 14 to raise the liquid pressure, the coil 39 is energized to attract the movable core 53 on the fixed core 33 side. As a result, the movable core 53 descends while deforming the second elastic body 18 so that the capacity of the first liquid chamber 24 is enlarged, whereby it is possible to restrict the rise in pressure in the chamber 24, and after all, the active type vibration isolating support system M generates an active supporting force for preventing the downward load from the engine E to the body frame F from being transmitted.

On the other hand, when the engine E is displaced upward and the capacity of the first liquid chamber 24 is enlarged to raise the pressure in the chamber 24, the coil 39 is demagnetized to release the movable core 53. As a result, the movable core 53 rises due to the repulsion force of the second elastic body 18 so that the capacity of the first liquid chamber 24 is reduced, whereby it is possible to restrict the drop in pressure in the chamber 24, and after all, the active type vibration isolating support system M generates an active supporting force for preventing the upward load from the engine E to the body frame F from being transmitted.

During such an operation, when with an excessive increase in the downward load from the engine E to the first elastic body 14, the pressure in the fist liquid chamber 24 is abruptly increased to apply the excessive downward load to the movable member 20, the movable member 20 first descends the movable core 53 to its descent limit, that is, until the lower end surface of the core 53 is abutted against the elastic plate 51 on the thick inner peripheral portion 36b of the lower yoke 36. Thereafter, the set spring 57 is compressed and becomes deformed so that the adjustment nut 56 is moved away from the underside of the movable core 53, whereby the movable member 20 is allowed to further move toward the fixed core 33 side. Accordingly, by causing the set spring 57 to absorb the excessive load of the movable member 20, it is possible to prevent mutual contact between the fixed core 33 and the movable core 53, and the excessive load acting on the movable core 53 and the elastic plate 51, and to secure their durability.

Thus, if after the movable core 53 reaches the descent limit, the movable member 20 descends by a predetermined amount, the adjustment nut 56 will abut against a bottom portion 61c of the peg body 61 fixed to the fixed core 33 through the elastic plate 63 to restrict any excessive increase in the load on the set spring 57, thereby preventing any increase in over-load on the fixed core 33 and the movable core 53.

Characteristics in thrust and displacement of the movable member 20 of the active type vibration isolating support system M are dependent on an initial air gap g between attracted surfaces 33a, 53a of the fixed core 33 and the movable cores 33, 53 in a non-operating state of the actuator 31. However, the initial air gap g may not be within the tolerance due to accumulated manufacturing errors of each portion from the installation area of the second elastic body 18 to the movable core 53. In such a case, a threaded position of the adjustment nut 56 with respect to the connecting bolt 55 is advanced and retreated as described above, whereby the initial air gap g can be adjusted properly and easily. Therefore, by energizing the coil 39, it becomes possible to impart predetermined thrust and displacement to the movable member 20 with high precision, to thereby improve the performance of the active type vibration isolating support system M.

Also, if plural types of active type vibration isolating support systems M having different initial air gaps g between the fixed core 33 and the movable cores 33, 53 are prepared by operating the adjustment nut 56, it will be possible to easily obtain active type vibration isolating support systems M having characteristics corresponding to plural car models, thereby contributing to reduction of cost.

Moreover, since the adjustment nut 56 is operated through the adjustment operating hole 60 of the fixed core 33 opened outside the housing 32, the initial air gap g can be accurately adjusted without regard to assembly errors in each portion after the completion of assembly of the active type vibration isolating support system M.

Although the fixed core 33 becomes hollow because it has the adjustment operating hole 60, the positioning shaft 33b integral therewith is pressed into the positioning hole 37 in the bottom wall 32b of the housing 32 and the flange-shaped lower yoke 36 is brought into close contact with the bottom wall 32b, whereby the fixed core 33 is firmly reinforced, and even if it receives an abutting shock from the movable core 53, is capable of withstanding the shock sufficiently and besides causes no position shift. Moreover, since the lower yoke 36 effectively increases magnetic paths around the coil assembly 34 in cooperation with the housing 32 and the upper yoke 35, the attracting force between the fixed and movable cores 33, 53 can be increased.

On the other hand, an ascent limit of the movable core 53 is defined by its upper end abutting against an inward flange 50a of the bearing member 50. When the movable core 53 abuts against the inward flange 50a shockingly, the impulse force is transmitted to the set spring 52 through the bearing member 50 and the outward flange 50b, to be absorbed by the elasticity of the set spring 52. Therefore, the set spring 52 also serves as an impulse absorbing member which protects the movable core 53 and the bearing member 50 from the impulse force.

Since the movable core 53 is elastically held on the adjustment nut 56 by the set spring 57 and an adequate play is provided between the inner surface of the through-hole 54 in the movable core 53 and the connecting bolt 55, the movable core 53 and the connecting bolt 55 are capable of relatively oscillating. Therefore, when during an operation of the active type vibration isolating support system M, a load in an inclined direction is applied to the movable member 20, it is possible to prevent the movable core 53 from inclining for maintaining a good sliding relationship with the bearing member 50 by means of the oscillation of the connecting bolt 55. In this case, with the oscillation of the connecting bolt 55, the set spring 57 moves sideways more or less, however, between this set spring 57 and the movable core 53, there is interposed a spring seat 65 for holding the lower end portion of the set spring 57, and yet, on an abutted surface between the spring seat 65 and the movable core 53, there is formed a low friction material layer. Thus, the spring seat 65 smoothly slides on the upper surface of the movable core 53 along with the set spring 57, thereby effectively suppressing production of abrasion powder from the movable core 53. Therefore, it is possible to prevent trouble resulting from the abrasion powder, in such a case where the abrasion powder enters sliding portions of the bearing member 50 and the movable core 53 to hinder the movement of the movable core 53.

With very simple structure in which a set spring 52 is provided in a compressed state between the outward flange 50b at the lower end of the bearing member 50 and the upper yoke 35, the bearing member 50 is installed at a fixed position on the lower yoke 36. Therefore, no high precision is needed for the installation, and the cost can be reduced. Moreover, since the set spring 52 is to be arranged on the outer periphery side of the bearing member 50, even if friction powder occurs between this set spring 52 and a portion against which the set spring 52 presses, it is possible to prevent the friction powder from entering the bearing member 50. Particularly since between the outward flange 50b and the lower yoke 36, there is interposed an elastic plate 51 which is brought into close contact with them, it is possible to reliably prevent the friction powder from entering the bearing member 50 by the elastic plate 51, and the bearing member 50 is capable of exhibiting excellent guidance property for the movable core 53 over a long period of time.

Also, since a repulsion force of the set spring 52 is supported by the upper yoke 35 continuing to the housing 32 and is not exerted on the movable core 53, it is possible to prevent loss of an effective attracting force between the fixed and movable cores 33, 53 due to the repulsion force of the set spring 52, thereby improving the output performance of the movable core 53.

In the coil assembly 34, since there is molded a coil cover 41 which is brought into close contact with outer peripheral surfaces of the coil 39 and the bobbin 38 so as to seal the coil 39 to the bobbin 38, it is possible to enhance water resistance of the coil 39. Moreover, since on the coil cover 41, there has been integrally formed a coupler 42 for holding the coupler terminal 40 to protrude outward in the radial direction, there is no need for a lead wire to be connected to the coil 39 and a coupler holder for supporting the coupler, so that a number of components and assembly man-hour are reduced, and the cost can be reduced.

Also, on one end surface of the bobbin 38, there is integrally formed a small strut 38a for insert-connecting a proximal end portion of the coupler terminal 40; around this small strut 38a, there is wound an outgoing line 39a of the coil 39 to be connected to the coupler terminal 40; and thereafter, a protruded portion 42a for enveloping the small strut 38a and the outgoing line 39a to protrude from the lower end surface of the coil cover 41 is integrally formed with the coil cover 41 together with the coupler 42. Therefore, the outgoing line 39a of the coil 39 is wound around the small strut 38a, whereby it is possible to mold the coil cover 41, the coupler 42 and the protruded portion 42a while reliably preventing the outgoing line 39a from loosening.

When the coupler 42 is further exposed to the outside through an aperture 43 provided from the peripheral wall of the housing 32 over to the bottom wall 32b, the protruded portion 42a is arranged at the aperture 43 so as to be adjacent to the bottom wall 32b. Therefore, there is no need for the provision of accommodation space for the protruded portion 42a in the housing 32, and the protruded portion 42a needs not be overhung over the outer surface of the housing 32, whereby the actuator 31 can be made compact.

Next, the description will be made of a second embodiment of the present invention shown in FIG. 9.

This second embodiment is different from the first embodiment in closed structure of an adjustment operating hole 60 of the fixed core 33. More specifically, the adjustment operating hole 60 is constructed by lining fitted holes 60c having a large diameter to the lower end of the simple through-hole 60a having no thread via an annular shoulder portion 60b, and the inner peripheral surface of the fitted hole 60c is provided with an annular restraining groove 58. On the other hand, a peg body 61 corresponds to one obtained by cutting off the threaded tube 61a from the peg body 61 of the first embodiment. In the fitted hole 60c, a collar portion 61b of the peg body 61 is fitted via a sealing member 64, and between this collar portion 61b and the shoulder portion 60b at the upper end of the fitted hole 60c, there is interposed an elastic member 72 such as a wave washer. Thus, in a state in which the elastic member 72 has been compressed by the peg body 61, a stopper ring 71 for supporting the underside of the peg body 61 is engaged with the restraining groove 58.

With the above-described structure having no threaded tube 61a, the peg body 61 can be downsized by an amount corresponding to the threaded tube 61a of the peg body 61 in the first embodiment, and on installing to the adjustment operating hole 60, since the need to rotate the peg body 61 can be circumvented, this is advantageous to maintain the durability of the sealing member 64.

Figure 9:
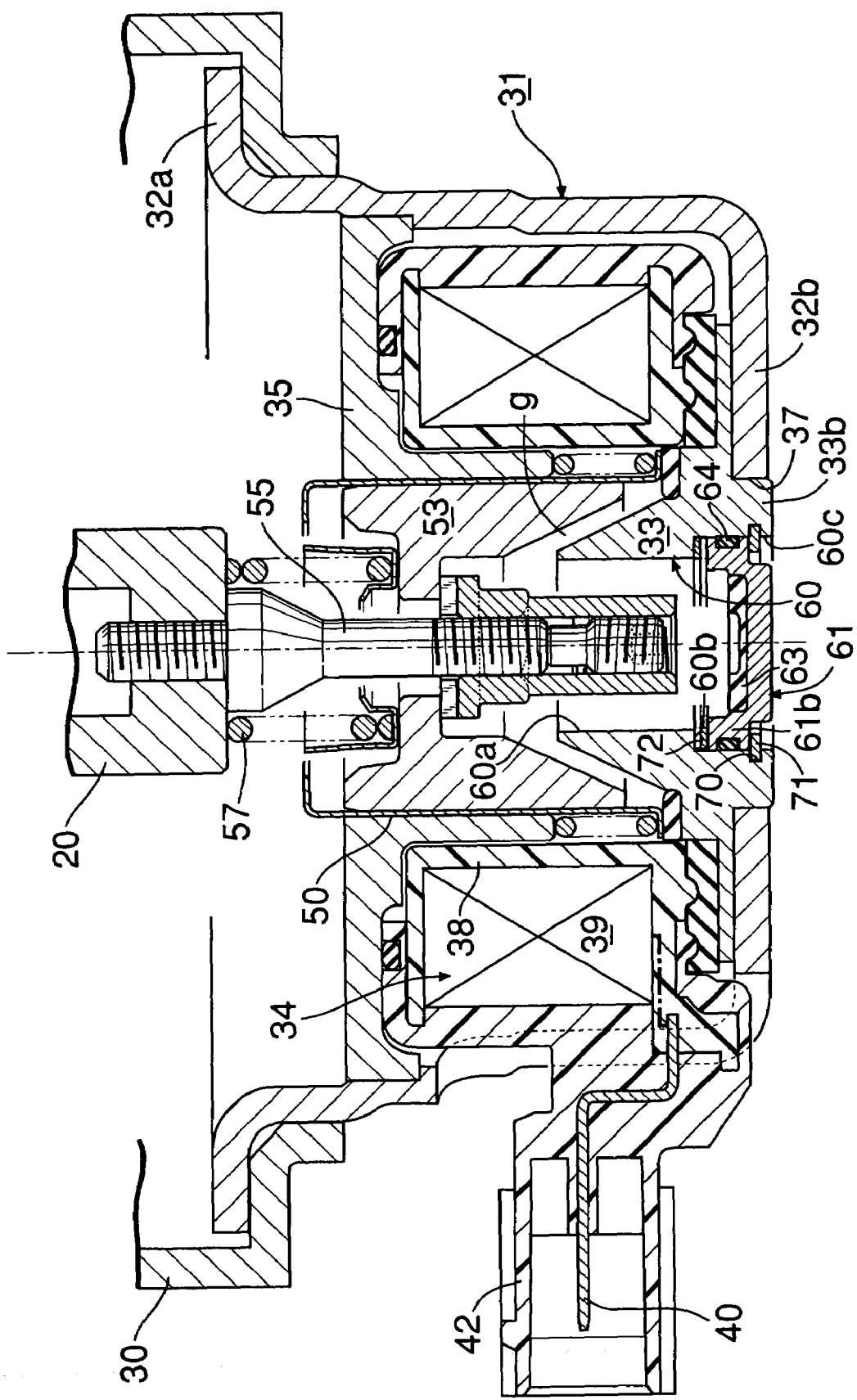
FIG. 9 shows a second embodiment of the present invention similar to FIG. 4.

Since the other components in the structure are the same as those of the first embodiment, portions corresponding to those of the first embodiment in FIG. 9 are designated by the same reference numerals, and description thereof will be omitted.

The present invention is not limited to the above-described embodiment, but it is possible to change the design in various ways without departing from the gist of the invention. For example, in the above-described embodiments, the movable member 20 and the connecting bolt 55 are integrated by forming them as separate members and threadably connecting together, but the members 20, 55 may be integrally constructed from the same material. Also, the fitted portion between the positioning shaft 33b of the fixed core 33 and the positioning hole 37 in the bottom wall 32b of the housing 32 may be fixed by welding instead of press-fitting.

What is claimed is:

1. An active type vibration isolating support system comprising:
   an elastic body for elastically supporting a vibratory body on a supporting system;
   a liquid chamber defined by this elastic body, in which liquid is sealed;
   a movable member for changing capacity of this liquid chamber; and
   an electromagnetic actuator for driving this movable member,
   wherein the actuator comprises:
      a fixed core supported by the supporting system;
      a movable core coupled to the movable member and arranged opposite to the fixed core via an air gap;
      a coil for generating an electromagnetic attracting force between the fixed and movable cores; and
      coupling devices for coupling the movable member and the movable core,
   wherein operating said coupling devices adjusts the air gap between the fixed core and the movable core.

2. The active type vibration isolating support system according to claim 1, wherein each coupling device comprises:
   a coupling bolt made integral with the movable member to penetrate the movable core in the axial direction;
   an adjustment nut which threadedly engages with a tip end of this coupling bolt and is able to advance and retreat the movable core with respect to the fixed core by an advance and retreat of its threadedly engaged position; and
   a set spring, which is provided between the movable member and the movable core in a compressed state, for biasing the movable core in a direction abutting against the adjustment nut.

3. The active type vibration isolating support system according to claim 1, wherein a spring seat is interposed between the set spring and the movable core.

4. The active type vibration isolating support system according to claim 2, wherein a spring seat is interposed between the set spring and the movable core.

5. The active type vibration isolating support system according to claim 1, further comprising:
   a housing for accommodating and holding the fixed core and the coil of the actuator;

a yoke fixed to the housing and having a cylindrical portion surrounded by the coil;

a cylindrical bearing member slidably fitted on an inner peripheral surface of the cylindrical portion of the yoke for slidably supporting the movable core;

an outward lower flange formed at a lower end of the cylindrical bearing member and supported on a supporting portion continuing to the fixed core;

a set spring provided between the lower flange and the cylindrical portion of the yoke in a compressed state for urging the lower flange against the cylindrical portion; and an inward upper flange formed at an upper end of the bearing member for receiving the movable core to define a limitation of movement of the movable core in a direction apart from the fixed core.

6. The active type vibration isolating support system according to claim 1, further comprising:

a housing for accommodating and holding the fixed core and the coil of the actuator;

a yoke fixed to the housing and having a cylindrical portion surrounded by the coil;

a cylindrical bearing member slidably fitted on an inner peripheral surface of the cylindrical portion of the yoke for slidably supporting the movable core;

an outward lower flange formed at a lower end of the cylindrical bearing member and supported on a supporting portion continuing to the fixed core;

a set spring provided between the lower flange and the cylindrical portion of the yoke in a compressed state for urging the lower flange against the cylindrical portion; and an inward upper flange formed at an upper end of the bearing member for receiving the movable core to define a limitation of movement of the movable core in a direction apart from the fixed core.

7. The active type vibration isolating support system according to claim 1, further comprising:

a housing for accommodating and holding the fixed core and the coil of the actuator;

a yoke fixed to the housing and having a cylindrical portion surrounded by the coil;

a cylindrical bearing member slidably fitted on an inner peripheral surface of the cylindrical portion of the yoke for slidably supporting the movable core;

an outward lower flange formed at a lower end of the cylindrical bearing member and supported on a supporting portion continuing to the fixed core;

a set spring provided between the lower flange and the cylindrical portion of the yoke in a compressed state for urging the lower flange against the cylindrical portion; and an inward upper flange formed at an upper end of the bearing member for receiving the movable core to define a limitation of movement of the movable core in a direction apart from the fixed core.

8. The active type vibration isolating support system according to claim 1, further comprising:

a housing for accommodating and holding the fixed core and the coil of the actuator;

a yoke fixed to the housing and having a cylindrical portion surrounded by the coil;

a cylindrical bearing member slidably fitted on an inner peripheral surface of the cylindrical portion of the yoke for slidably supporting the movable core;

an outward lower flange formed at a lower end of the cylindrical bearing member and supported on a supporting portion continuing to the fixed core;

a set spring provided between the lower flange and the cylindrical portion of the yoke in a compressed state for urging the lower flange against the cylindrical portion; and an inward upper flange formed at an upper end of the bearing member for receiving the movable core to define a limitation of movement of the movable core in a direction apart from the fixed core.

9. An active type vibration isolating support system comprising:

an elastic body for elastically supporting a vibratory body on a supporting system;

a liquid chamber defined by the elastic body, in which liquid is sealed;

a movable member for changing capacity of the liquid chamber; and an electromagnetic actuator for driving the movable member, wherein the actuator comprises:

a fixed core to be supported on the supporting system;

a movable core to be coupled to the movable member for being arranged opposite to the fixed core via a conical tube-shaped air gap;

a coil for generating an electromagnetic attracting force between the fixed and movable cores;

a coupling device coupled to the movable member to penetrate the movable core in an axial direction to be relatively movable to support a fixed core-side end surface of the movable core;

a set spring provided between the movable member and the movable core in a compressed state, for biasing the movable core toward a supporting portion of the coupling device; and a stopper member which, even after the movable core has reached a limit of movement on the fixed core-side end surface, enables movement of the movable member toward the fixed core-side end surface while the movable member compresses the set spring, and, in order to restrict compression and deformation of the set spring in a predetermined amount or more, limits an amount of movement of the movable member after the movable core reaches the limit of movement, wherein operating said coupling device adjusts the air gap between the fixed core and the movable core.

10. The active type vibration isolating support system according to claim 1, wherein a sealing member is provided between the peg body and the fixed core.

11. An active type vibration isolating support system comprising:

an elastic body for elastically supporting a vibratory body on a supporting system;

a liquid chamber defined by this elastic body, in which liquid is sealed;

a movable member for changing capacity of this liquid chamber; and an electromagnetic actuator for driving this movable member, wherein the actuator comprises:

a fixed core supported by the supporting system;

a movable core coupled to the movable member and arranged opposite to the fixed core via an air gap;

a coil for generating an electromagnetic attracting force between the fixed and movable cores;

coupling devices for coupling the movable member and the movable core to adjust the air gap between the fixed core and the movable core, a housing for accommodating and holding the fixed core and the coil of the actuator;

a yoke fixed to the housing and having a cylindrical portion surrounded by the coil;

a cylindrical bearing member slidably fitted on an inner peripheral surface of the cylindrical portion of the yoke for slidably supporting the movable core;

an outward lower flange formed at a lower end of the cylindrical bearing member and supported on a supporting portion continuing to the fixed core;

a set spring provided between the lower flange and the cylindrical portion of the yoke in a compressed state for urging the lower flange against the cylindrical portion; and an inward upper flange formed at an upper end of the bearing member for receiving the movable core to define a limitation of movement of the movable core in a direction apart from the fixed core.

12. The active type vibration isolating support system according to claim 11, wherein each coupling device comprises:

a coupling bolt made integral with the movable member to penetrate the movable core in the axial direction;

an adjustment nut which threadedly engages with a tip end of this coupling bolt and is able to advance and retreat the movable core with respect to the fixed core by an advance and retreat of its threadedly engaged position; and a set spring, which is provided between the movable member and the movable core in a compressed state, for biasing the movable core in a direction abutting against the adjustment nut.

13. The active type vibration isolating support system according to claim 11, wherein a spring seat is interposed between the set spring and the movable core.

14. The active type vibration isolating support system according to claim 12, wherein a spring seat is interposed between the set spring and the movable core.

* * * * *